United States Patent
Saito et al.

(10) Patent No.: US 7,312,724 B2
(45) Date of Patent: Dec. 25, 2007

(54) IN-VEHICLE APPLICATION SELECTING SYSTEM AND IN-VEHICLE APPLICATION SELECTING DEVICE

(75) Inventors: Hiroshi Saito, Kyoto (JP); Toshiyuki Kozuru, Kyoto (JP)

(73) Assignee: Omron Corporation, Kyoto (JP)

( * ) Notice: Subject to any disclaimer, the term of this patent is extended or adjusted under 35 U.S.C. 154(b) by 191 days.

(21) Appl. No.: 11/035,032

(22) Filed: Jan. 13, 2005

(65) Prior Publication Data

US 2005/0179524 A1 Aug. 18, 2005

(30) Foreign Application Priority Data

Jan. 14, 2004 (JP) .............................. 2004-007161

(51) Int. Cl.
G08G 1/017 (2006.01)
G08G 1/054 (2006.01)
(52) U.S. Cl. .................. 340/937; 340/439; 340/575
(58) Field of Classification Search ........... 340/937, 340/439, 575, 576; 180/272
See application file for complete search history.

(56) References Cited

U.S. PATENT DOCUMENTS

| 5,369,584 A | 11/1994 | Kajiwara |
| 5,745,031 A * | 4/1998 | Yamamoto ................. 340/439 |
| 6,724,920 B1 * | 4/2004 | Berenz et al. ............. 340/575 |
| 2003/0212480 A1 | 11/2003 | Lutter et al. |
| 2005/0219058 A1 * | 10/2005 | Katagiri et al. ............ 340/575 |
| 2006/0006990 A1 * | 1/2006 | Obradovich ................ 340/439 |

FOREIGN PATENT DOCUMENTS

| DE | 44 14 216 C1 | 4/1995 |
| GB | 2 311 602 A | 10/1997 |

OTHER PUBLICATIONS

European Search Report dated Jul. 14, 2006; Application No. 05100109.7 (3 pages).

* cited by examiner

*Primary Examiner*—John Tweel, Jr.
(74) *Attorney, Agent, or Firm*—Osha Liang LLP

(57) ABSTRACT

Providing a technique in which a picked-up image is given to an appropriate in-vehicle device or application and this device or application is then operated so that a variety of in-vehicle applications can be most suitably operated. According to an output from a sensor for measuring a state of a vehicle, quality of a picked-up image, a state of an occupant or the like is estimated, and based on the estimation results, an in-vehicle application to be executed is selected and executed.

10 Claims, 5 Drawing Sheets

Fig. 2

| Code | In-vehicle application section |
|---|---|
| 00001 | Face position detection |
| 00010 | Face position detection, Doze detection, Looking-aside detection, Sight-line detection |
| 00110 | Face position detection, Sight-line detection, Doze detection |
| 01100<br>01000 | Personal identification, Face position detection |
| 10010 | None |

7a

IN-VEHICLE APPLICATION SELECTING SYSTEM AND IN-VEHICLE APPLICATION SELECTING DEVICE

BACKGROUND OF THE INVENTION

1. Field of the Invention

The present invention relates to a technique that is effective in application to a vehicle equipped with devices, software, and the like, which execute a variety of processes by use of an image picked up in the vehicle.

2. Description of the Related Art

There have hitherto been proposed a variety of devices and applications (hereinafter referred to as "in-vehicle applications") for offering a service to an occupant by use of an image picked up by a pick-up device installed in a vehicle (hereinafter referred to as "in-vehicle camera"). Examples of techniques used for such in-vehicle applications include the following: a technique of picking up an image of a driver's face for identification, to determine whether the driver is a proper driver or not; a technique of detecting a sight-line direction or a face orientation of a driver from an image, to detect looking aside of the driver; and a technique of detecting the way a driver's eyes are open, from an image, to detect an awake level of the driver.

The balance of a vehicle occupant is susceptible to movement of the vehicle as well as a driving condition. For this reason, a picked-up image is not necessarily suitable for all of the variety of in-vehicle applications thus described. For example, when a vehicle pitches, associated with irregularity of a road surface, the vehicle occupant is also shaken vertically according to the pitching of the vehicle. If an image is picked up in this status, a vertically blurred image of the occupant, an image of the occupant's face with the upper part thereof out of the image region, or the like, might be picked up. Such a low-quality image picked up in the manner thus described has caused a decrease in process accuracy when used for example in identification processing or sight line detection processing.

In order to deal with such a problem, there is a technique in which a shake amount of an automobile is calculated for use in image correction so as to produce an image free of the influence of the shake due to irregularity of a road surface or steering. However, executing such image correction is time consuming. In the case of picking up an image of hardly sufficient quality thus described, therefore, the image has caused a delay in operation of an in-vehicle application.

There is also a technique attempting to solve the problem without the image correction thus described. It is for example possible that quality of a picked-up image is determined by image processing, and when the quality of the picked-up image is determined as insufficient, operation of an in-vehicle application using this image is prohibited. However, this may result in a delay in operation of an in-vehicle application since it takes time to execute the image processing for determining quality of a picked-up image.

There has further been proposed a technique in which, when a vehicle driving speed is not faster than a certain speed, when a steering angle or a yaw rate is not smaller than a prescribed angle or rate, or when a driver is not wearing a seatbelt, the vehicle, since not driving in a normal state, is determined to be in a state where incorrect identification is apt to occur, and thereby a process of identifying the driver's face from an image is prohibited. In such a technique, it is determined whether quality of a picked-up image is sufficient or not, without executing image processing. As for an image of quality determined as insufficient, this image is not corrected, but a process using the image is prohibited. It is thereby possible to avoid a delay caused by image processing or image correction.

SUMMARY OF THE INVENTION

However, since there are a variety of in-vehicle applications, an image having been picked up in some situation and unusable in one in-vehicle application is not necessarily unusable in another in-vehicle application. For example, in the foregoing technique, based on the recognition that incorrect identification tends to occur when a driving speed of a vehicle is not faster than a certain speed, or when a steering angle or a yaw rate is not smaller than a prescribed angle or rate, a process of identifying the driver's face from an image picked up in such a situation is prohibited. However, there are some other kinds of in-vehicle applications capable of sufficiently processing the foregoing low-quality image that might bring about incorrect identification. Prohibiting such operable in-vehicle applications has lead unnecessarily to deterioration in performance of the vehicle.

There are still some other kinds of in-vehicle applications which are normally operable but need not be operated in some specific situation. Executing such an in-vehicle application results in applying unnecessary loading to a resource such as an information processing device installed in the vehicle. Consequently, other processes (processes of other in-vehicle applications), which are desired to be executed at a high speed, have been delayed.

It is an object of the present invention to provide a technique in which a picked-up image is given to an appropriate in-vehicle application, without executing image processing nor image correction, to allow a variety of in-vehicle applications to be operated at a high speed with no improper operation involved.

In order to solve the above problems, the present invention is configured as follows. The present invention is an in-vehicle application selecting system, comprising: a pick-up means of picking up an image of the vehicle occupant; a plurality of in-vehicle application executing means each using an image picked up by the pick-up means to offer a service to the vehicle occupant; a sensor for measuring a state of the whole or part of the vehicle; and a selection means of selecting an in-vehicle application executing means to be operated among the plurality of in-vehicle application executing means, according to an sensor output, to operate the selected in-vehicle application executing means.

The "service" means a service of executing an operation for awaking the occupant determined to be in a low awake level (specifically, an operation of sounding a warning, an operation of shaking a seat on which the occupant is seated, etc.), a service of starting up an engine only when the occupant is determined as a proper driver after personal identification, or some other services.

In the present invention, based on a sensor output at the time each image is picked up, the selection means selects an in-vehicle application executing means to offer a service by use of the picked-up image. For example, the selection means may be configured to estimate quality of a picked-up image based on a sensor output at the time each image is picked up, and then select an in-vehicle application executing means operable using an image of the estimated quality. Here, "operable using an image of the estimated quality" means that an in-vehicle application executing means is operable, while hardly lowering the accuracy thereof, even when using an image of the estimated quality. Further, for example, the selection means may be configured to estimate a state of the vehicle or the driver when an image is picked up, based on a sensor output at the time each image is picked up, and then select an in-vehicle application executing means which is required in the estimated state.

Herein, high-quality images include an image in which the edge of an object or part of an object represented is clear, and an image within which an object is represented. On the other hand, low-quality images include an image in which the edge of an object or part of an object represented is blurred, and an image within which an object is only partially represented with the other part off the image frame.

According to the present invention, an in-vehicle application executing means to be operated is selected according to an output of the sensor for measuring a state of the vehicle. Namely, an in-vehicle application executing means is selected based on a state of the vehicle.

The selection means of the present invention may be configured to comprise: a table storing means of storing a table making a sensor output correspond to an in-vehicle application executing means which is properly operable using an image of quality estimated from the sensor output; and a control means of selecting an in-vehicle application executing means corresponding to the sensor output from the table, to operate the selected in-vehicle application executing means.

In the present invention thus configured, according to an output of the sensor for measuring a state of the vehicle, an in-vehicle application executing means is selected which is normally operable using an image of quality estimated from the sensor output. Therefore, even in the case of estimating that a low-quality image (e.g. an image likely to cause incorrect identification in identification processing) has been picked up, an in-vehicle application executing means normally operable even using such a low-quality image can be selected and then executed. It is therefore possible to prevent prohibition of operating an in-vehicle application executing means normally operable even using a low-quality image.

Further, the selection means of the present invention may be configured to comprise: a table storing means of storing a table making a sensor output correspond to an in-vehicle application executing means which is required in a driver's state estimated from the sensor output; and a control means of selecting an in-vehicle application executing means corresponding to the sensor output from the table, to operate the selected in-vehicle application In the present invention thus configured, according to an output of the sensor for measuring a state of the vehicle, an in-vehicle application executing means is selected which is required in the driver's state estimated from the sensor output. Therefore, an in-vehicle application executing means which is not required in the estimated driver's state is not selected even when it is normally operable. Accordingly, not allowing operation of an unnecessary in-vehicle application executing means makes it possible to prevent inducing a delay in processing another in-vehicle application executing means which is actually required to be operated.

Further, the sensor of the present invention may include a sensor for measuring vibration of the vehicle, and the table makes an output of the sensor for measuring vibration of the vehicle indicating vibration not lower than a prescribed level, correspond only to an in-vehicle application executing means properly operable using a blurred image of a face. Herein, the table may further make an output of another sensor correspond to the in-vehicle application executing means.

In the present invention thus configured, when the sensor for measuring a state of the vehicle measures vibration not lower than a prescribed level, an in-vehicle application executing means normally operable using a blurred image of a face is selected and then executed. Since an occupant's body typically vibrates when the vehicle vibrates, an image blurred in a vibrating direction may be picked up. However, even when a blurred image is picked up, the selection means selects an in-vehicle application executing means normally operable using a blurred image of a face. It is therefore possible to prevent occurrence of improper operation of an in-vehicle application executing means in operation. In other words, it is possible to improve accuracy in operation of an in-vehicle application executing means.

Further, the "in-vehicle application executing means normally operable using a blurred image of a face" may for example be an in-vehicle application executing means to be operated by detecting a position of a person's face from an inputted image. Generally, a process of detecting a feature amount of a face (data for use in face identification), a sight line or the like might be improperly operated unless executed using a high-quality image. On the other hand, a process of detecting a position of a person's face can be normally executed even using a low-quality image, such as a blurred image, since the process can be realized for example by detecting an oval, flesh-colored region or detecting a pattern of a concentration ratio of a face estimated. It is therefore possible to attempt to prevent improper operation by employing an in-vehicle application executing means to be operated by detecting a face position, as an example of an in-vehicle application executing means normally operable using a blurred image of a face.

A second embodiment of the present invention is an in-vehicle application selecting device, comprising: an input means of receiving an image of the vehicle occupant picked up by a pick-up means; a determination means of determining a state of the vehicle when the received image of the occupant was picked up, from an output of a sensor for measuring the whole or part of the vehicle; and a selection means of selecting an in-vehicle application to be provided with the received image of the occupant, among a plurality of in-vehicle applications each using an image picked up by the pick-up means to offer a service to the driver of the vehicle.

In the second embodiment of the present invention, the selection means selects an in-vehicle application based on a state of the vehicle determined by the determination means from the image received by the input means. It is therefore possible to obtain the same effect as that of the first embodiment of the present invention, by installing the in-vehicle application selecting device as the second embodiment of the present invention, in an automobile equipped with a pick-up means and the sensor.

The first embodiment and the second embodiment of the present invention may be realized by execution of programs by an information processing device. Namely, a program for making the information processing device execute a process to be executed by each of the foregoing means, or a record medium recording the program therein, may be specified, and then used to obtain the foregoing functions or effects.

According to the present invention, an in-vehicle application executing means to be operated is selected according to an output of the sensor for measuring a state of the vehicle. It is therefore possible to control a variety of in-vehicle applications so as to be operated at a high speed with no improper operation involved, without executing image processing nor image correction.

BRIEF DESCRIPTION OF THE DRAWINGS

FIG. 2 shows a view showing an example of a table.

DETAILED DESCRIPTION

Figure 1:
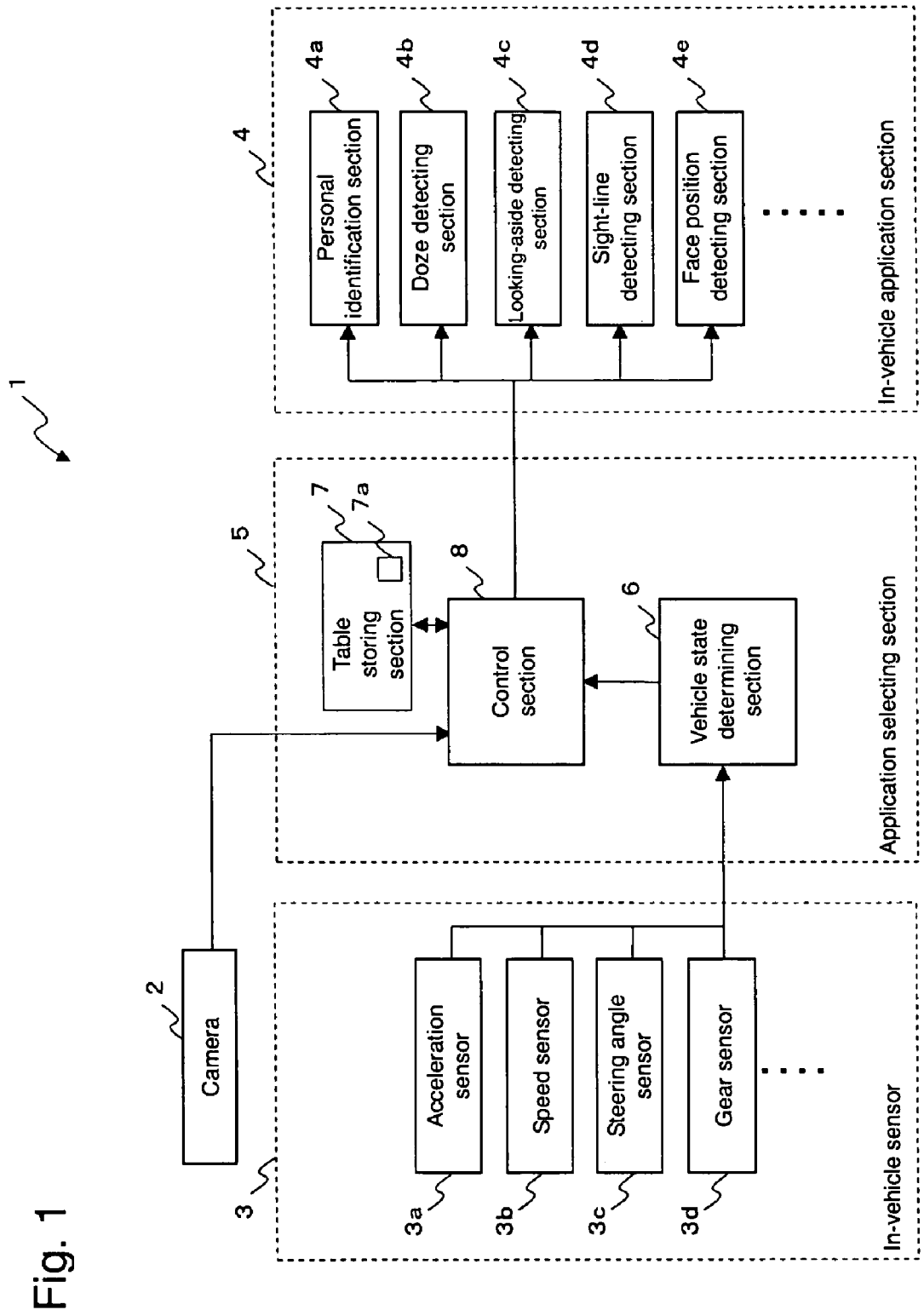
FIG. 1 shows a view showing a functional block of an application selecting system.

Next, an application selecting system 1 is described using the drawing. It is to be noted that the following configurations of the application selecting system 1 are examples, and thus do not limit the configurations of the present invention.

[System Configuration]

FIG. 1 is a view showing a constitutional example of the application selecting system 1. By use of FIG. 1, the configuration of the application selecting system 1 is described.

The application selecting system 1 is configured using a camera 2, an in-vehicle sensor 3, an in-vehicle application section 4, and an application selecting section 5. Each of these components to be installed in the application selecting system 1 is described below.

[Camera]

The camera 2 is configured using a digital still camera/digital video camera, etc. The camera 2 picks up an image to be used in each application installed in the in-vehicle application section 4. In the application selecting system 1, the camera 2 is installed so as to pick up the face of the driver seated on the driver seat of the vehicle.

The camera 2 may be configured to regularly pick up an image, or to pick up an image continuously from the time of turning a start-switch on by hand until the time of turning a stop-switch on by hand or a timer, or the camera 2 may be configured to have a control device to control start/stop of image taking under a prescribed condition based on an output of the sensor installed in the vehicle.

[In-vehicle Sensor]

The in-vehicle sensor 3 is configured using a variety of sensors. The in-vehicle sensor 3 is installed in the vehicle. The in-vehicle sensor 3 is configured using, for example, an acceleration sensor 3a, a speed sensor 3b, a steering angle sensor 3c and a gear sensor 3d. The in-vehicle sensor 3 may be configured using any other sensor as appropriate.

The acceleration sensor 3a measures an acceleration of the vehicle. The acceleration sensor 3a measures the acceleration of the vehicle with respect to a vertical direction to the ground. The acceleration sensor 3a is configured using, for example, a triaxial acceleration sensor.

The speed sensor 3b measures a speed of the vehicle. The speed sensor 3b measures the speed of the vehicle with respect to a traveling direction of the vehicle. The speed sensor 3b is configured using, for example, a wheel speed sensor.

The steering angle sensor 3c measures a steering angle of the vehicle. The steering angle sensor 3c measures a steering angle for example by means of a steering position.

A gear sensor 3d detects a position of a gear of the vehicle. The gear sensor 3d at least detects the neutral state or reversed state of the vehicle gear. The gear sensor 3d is configured using, for example, a so-called neutral sensor and a back-up lamp switch.

Although not shown in the figure, a seat sensor and an illumination sensor can be cited as other in-vehicle application sensors. Further, systems such as GPS (Ground Positioning System), ETC (Electronic Toll Collection) and Smart Entry can also be applied as sensors.

The seat sensor detects on which seats a driver and occupants are sitting. The seat sensor is configured using, for example, a membrane switch.

The illumination sensor measures an illumination of a camera-shooting environment. The illumination sensor may be configured using, for example, an illumination sensor built in the camera, or an illumination sensor disposed on a dashboard.

Using a receiver of GPS as a sensor allows measuring the position of the vehicle on the map. This then allows detection of a state of a road on which the vehicle is traveling. Specifically, whether the vehicle is traveling on an expressway, or on a mountain road with many curve, can be detected.

Using an in-vehicle device of ETC as a sensor allows detecting that the vehicle is at an ETC gate and also the point in time when the vehicle user is charged.

Using an in-vehicle device of Smart Entry as a sensor allows detecting whether the vehicle user having a remote-control device is around the vehicle or not.

[In-Vehicle Application Section]

The in-vehicle application section 4 is configured using a plurality of function sections for realizing in-vehicle applications. The in-vehicle application section 4 is installed in the vehicle.

The in-vehicle application section 4 comprises, in terms of hardware, a CPU (Central Processing Unit) connected via a bus, a main memory unit (RAM), an auxiliary memory unit, and the like. The auxiliary memory unit is configured to comprise a nonvolatile memory unit. The nonvolatile memory unit here means: so-called ROMs (Read-Only Memories) including an EPROM (Erasable Programmable Read-Only Memory), an EEPROM (Electronically Erasable Programmable Read-Only Memory), and a mask ROM; FRAM (Ferroelectric RAM), a hard disc, or the like. Further, the in-vehicle application section 4 conducts necessary control on a device, according to an in-vehicle application to be applied. The device according to the in-vehicle application will be described later.

The in-vehicle application section 4 is functioned by loading of each kind of program (operating system, application, etc.) stored in the auxiliary memory unit into the main memory unit to execute the program by the CPU. Further, the whole or part of the in-vehicle application section 4 may be configured as a special-purpose chip.

The in-vehicle application 4 is configured using, for example, a personal identification section 4a, a doze detecting section 4b, a looking-aside detecting section 4c, a sight-line detecting section 4d, and a face position detecting section 4e. Each of these functional sections is realized by execution of the program thereof on hardware such as the CPU. The in-vehicle application section 4 may be configured using any other in-vehicle application as appropriate. However, in the application selecting system 1, the camera 2 is installed to pick up the face of the driver. Hence, in this example, the in-vehicle application to be applied to the in-vehicle application section 4 is limited to those for providing a service (process) to the driver.

The personal identification section 4a determines whether the vehicle driver is a proper person or not, and only when determining that the vehicle driver is a proper person, the in-vehicle application section 4 activates an engine. The personal identification section 4a makes a determination (personal identification processing) using an image picked up by the camera 2 and an image of the proper person previously registered. The personal identification section 4a functions as a control section for controlling start/stop of the engine according to the results of the personal identification processing.

The doze detecting section 4b determines whether the vehicle driver is dozing or not, and when determining that the vehicle driver is dozing, the in-vehicle application section 4 executes an operation for awaking the driver. The doze detecting section 4b obtains an image of the driver's eyes from images picked up by the camera 2, to determine whether or not the driver's eyelids are open for a width not smaller than a certain width. When determining the eyelids are open for a width smaller than a certain width, the doze detecting section 4b awakes the driver by, for example, activating a vibration device installed on the driver's seat, sounding a warning from a speaker installed in the vehicle, or by some other means. In this case, the doze detecting device 4b functions as a control section for the vibration device and the speaker. Further, the speaker may be a speaker previously installed in the vehicle as audiovisual apparatus, a speaker disposed for the looking-aside detecting section 4c, or a speaker independently prepared for the doze detecting section 4b.

The looking-aside detecting section 4c determines whether the vehicle driver is looking aside or not, and when determining looking-aside, the looking-aside detecting section 4c warns the driver so as not to look aside. The looking-aside detecting section 4c determines the orientation of the driver's face from an image picked up by the camera 2. When determining the face of the vehicle driver has turned to the side at an angle not smaller than a prescribed angle, the looking-aside detecting section 4c warns the driver by sounding a warning from a speaker installed in the vehicle or by some other means. In this case, the looking-aside detecting section 4c functions as a control section for the speaker. The speaker may be a speaker previously installed in the vehicle, a speaker disposed for the doze detecting section 4b, or a speaker independently prepared to function for the looking-aside detecting section 4c.

The sight-line detecting section 4d determines where the vehicle driver is looking. Namely, it determines the driver's sight line (gaze point). The sight-line detecting section 4d is configured to head-up display a danger mark in a direction of driver's gaze point when an obstacle to the vehicle is detected (e.g. Japanese Patent Laid-Open No. Hei 6-230132, Japanese Patent Laid-Open No. Hei 9-7100). Examples of such an obstacle include a pedestrian present in a traveling direction of the vehicle, and a two-wheeled vehicle with which the vehicle might collide when turning left. In this case, the sight-line detecting section 4d functions as a control section for the device for head-up display installed in the vehicle.

The face position detecting section 4e detects the position of the face of the vehicle driver from an image picked up by the camera 2, to determine whether the head is positioned. When an airbag is to be deployed, the face position detecting section 4e allows the airbag to be deployed to the position of the driver's head. The face position detecting section 4e functions as a control section for the airbag device installed in the vehicle, so as to deploy the airbag to the position of the driver's head when the sensor or the like has detected the collision of the vehicle with another object.

[Application Selecting Section]

The application selecting section 5 determines into which in-vehicle application in the in-vehicle application sections 4 each image picked up by the camera 2 is to be inputted (or which in-vehicle application is to be activated), according to an output of each sensor in the in-vehicle sensor 3. First, a functional block of the application selecting section 5 is described using FIG. 1.

The application selecting section 5 comprises, in terms of hardware, a CPU (Central Processing Unit) connected via a bus, a main memory unit (RAM), an auxiliary memory unit, and the like. The auxiliary memory unit is configured to comprise a so-called nonvolatile memory unit. These CPU, RAM, auxiliary memory unit and the like may be configured such that the whole or part thereof are shared with the in-vehicle application section 4.

The application selecting section 5 functions as a device comprising a vehicle state determining section 6, a table storing section 7, a control section 8, and the like, by loading of each kind of program (operating system, application, etc.) stored in the auxiliary memory unit into the main memory unit to execute the program by the CPU. In particular, the vehicle state determining section 6 and the control section 8 are realized by execution of the programs by the CPU. Further, the vehicle state determining section 6 and the control section 8 may be respectively configured as special-purpose chips. In the following, each of the functional sections of the application selecting section 5 is described.

<Vehicle State Determining Section>

The vehicle state determining section 6 outputs a signal (Code) indicating the state of the vehicle, based on output signals (data) of the in-vehicle sensor 3 (the acceleration sensor 3a, the speed sensor 3b, the steering angle sensor 3c and the gear sensor 3d). When the output signal is analog, it is digitalized. The Code is a variable having a 5-digit binary value.

The vehicle state determining section 6 calculates an acceleration "a" a vertical direction of the vehicle based on the data outputted from the acceleration sensor 3a. The vehicle state determining section 6 determines whether or not the calculated acceleration "a" is not more than a threshold Z1. Further, the vehicle state determining section 6 calculates a speed "v" of the vehicle based on the data outputted from the speed sensor 3b. The vehicle state determining section 6 determines whether or not the calculated speed "v" is not less than a threshold Z2. Moreover, the vehicle state determining section 6 calculates a steering angle "θ" of the vehicle based on the data outputted from the steering angle sensor 3c. The vehicle state determining section 6 determines whether or not the calculated steering angle "θ" is not more than a threshold Z3. Furthermore, the vehicle state determining section 6 determines whether or not the gear of the vehicle is in a neutral state and the speed "v" is zero, based on the data outputted from the gear sensor 3d. Further, the vehicle state determining section 6 determines whether the gear of the vehicle is reversed or not based on the data outputted from the gear sensor 3d. The vehicle state determining section 6 then controls variable Code values according to these determination results.

<Table Storing Section>

The table storing section 7 is configured using the so-called nonvolatile memory unit. The table storing section 7 stores a table 7a. FIG. 2 shows an example of the table 7a. The table 7a is described below.

In the table 7a, the variable Code values are corresponded to each of the functional sections (each in-vehicle application) of the in-vehicle application section 4 are corresponded. The control section 8 inputs a face image into the in-vehicle application corresponded to the Code value outputted by the vehicle state determining section 6.

Here, the Code value is described. The rightmost digit of the Code indicates whether or not the acceleration of the vehicle in the vertical direction to the ground has been determined to be not less than a threshold, namely whether or not the vehicle has been determined to be vibrating vertically in a scale not less than a prescribed scale. This digit, when being "1", indicates that the vehicle has been determined to be vibrating, whereas this digit, when being "0", indicates that the vehicle has been determined not to be vibrating.

The second digit from the right of the Code indicates whether or not the speed of the vehicle with respect to the traveling direction is not less than a threshold. This digit, when being "1", indicates that the speed has been determined to be not less than the threshold, whereas this digit, when being "0", indicates that the speed has determined to be less than the threshold.

The middle digit of the Code indicates whether or not the steering angle is determined to be not less than a threshold. This digit, when being "1", indicates that the steering angle has been determined to be not less than the threshold, whereas this digit, when being "0", indicates that the steering angle has determined to be less than the threshold.

The second digit from the left of the Code indicates whether or not the gear is determined to be in a neutral state and the speed to be zero, in other words, whether the vehicle is determined to be in a halted or parked state or not. This digit, when being "1", indicates that the vehicle has been determined to be in a halted or parked state, whereas this digit, when being "0", indicates that the vehicle has been determined to be in a traveling state.

The leftmost digit of the Code indicates whether the gear has been reversed or not. This digit, when being "1", indicates that the gear has been determined to be reversed, whereas this digit, when being "0", indicates that the gear has been determined not to be reversed.

Next, a specific example of the table 7a is described. The Code "00001" is corresponded to the face position detecting section 4e. The Code "00001" indicates that an image by the camera 2 has been determined to be an image picked up when the vehicle was vibrating vertically to the traveling direction. In this case, since an image of the driver's face or eyes might be vertically blurred, the process of the face position detecting section 4e, which does not require high accuracy of an image, is executed.

The Code "00010" is corresponded to the face position detecting section 4e, the doze detecting section 4b, the looking-aside detecting section 4c, and the sight-line detecting section 4d. The Code "00010" indicates that an image by the camera 2 has been determined to be an image picked up in a state where the vehicle was traveling straight in a semi-flat place at a speed not slower than a prescribed speed. In such a case, it is highly possible that a high quality image of the driver's face or eyes is picked up. Therefore, the doze detecting section 4b, the looking-aside detecting section 4c and the sight-line detecting section 4d, which require high-ish quality of an inputted image, can be executed. Further, the process of the face position detecting section 4e is also executed.

The Code "00110" is corresponded to the face position detecting section 4e, the sight-line detecting section 4d, and the doze detecting section 4b. The Code "00110" indicates that an image by the camera 2 has been determined to be an image picked up in a state where the vehicle was traveling a semi-flat curve or intersection at a speed not slower than a prescribed speed. In such a case, although it is highly possible that a high quality image of the driver's face or eyes is picked up, the driver is likely to look aside consciously for turning the curve or the intersection. In such a case, it is often useless for the looking-aside detecting section 4c to detect looking aside and give a warning, and such warning is annoying for the driver. Therefore, in this case, the process of the looking-aside detecting section 4c is not executed, and the processes of the face position detecting section 4ethe sight-line detecting section 4d and the doze detecting section 4b are executed.

The Codes "01100" and "01000" are corresponded to the personal identification section 4a and the face position detecting section 4e. The Codes "01100" and "01000" indicate that an image by the camera 2 has been determined to be an image picked up when the vehicle was being halted or parked. In such a case, although it is highly possible that a high quality image of the driver's face or eyes is picked up, since the vehicle is not traveling, the processes of the doze detecting section 4b, the sight-line detecting section 4d and the looking-aside detecting section 4c are not necessary. Therefore, in this case, the processes of the personal identification section 4a and the face position detecting section 4e are executed.

The Code "10010" is not corresponded to any of the in-vehicle applications. The Code "10010" indicates that an image by the camera 2 has been determined to be an image picked up when the vehicle was reverse driving at a speed not slower than a prescribed speed. In such a case, it is highly possible that the driver's face is not picked up by the camera 2 since the driver has turned to look at the backside. Therefore, in this case, none of the in-vehicle applications is executed.

Other Codes can also be corresponded to the in-vehicle application as appropriate. Allocation of the Codes to the states of the vehicle and the driver can be arbitrarily set. Further, the number of digits of the Code is increased or decreased according to the number of the state of the vehicle detected for selection of the in-vehicle application.

<Control Section>

An image picked up by the camera 2 is inputted into the control section 8. Further, from the table storing section 7, the control section 8 reads the in-vehicle application corresponding to a variable Code value outputted by the vehicle state determining section 6. The control section 8 then gives the image picked up by the camera 2 to the read in-vehicle application and issues an order for processing. Each of the foregoing in-vehicle applications may be configured to be in a state of waiting for an image and an order, and execute a process when given the image and the order.

For example, when the "00001" is outputted by the vehicle state determining section 6 as a variable Code value, the control section 8 reads "the face position detection" as the in-vehicle application to correspond to "00001". The control section 8 then passes the image picked up by the camera 2 to the face position detecting section 4e and issues an order for processing.

[Operation Example]

Figure 3:
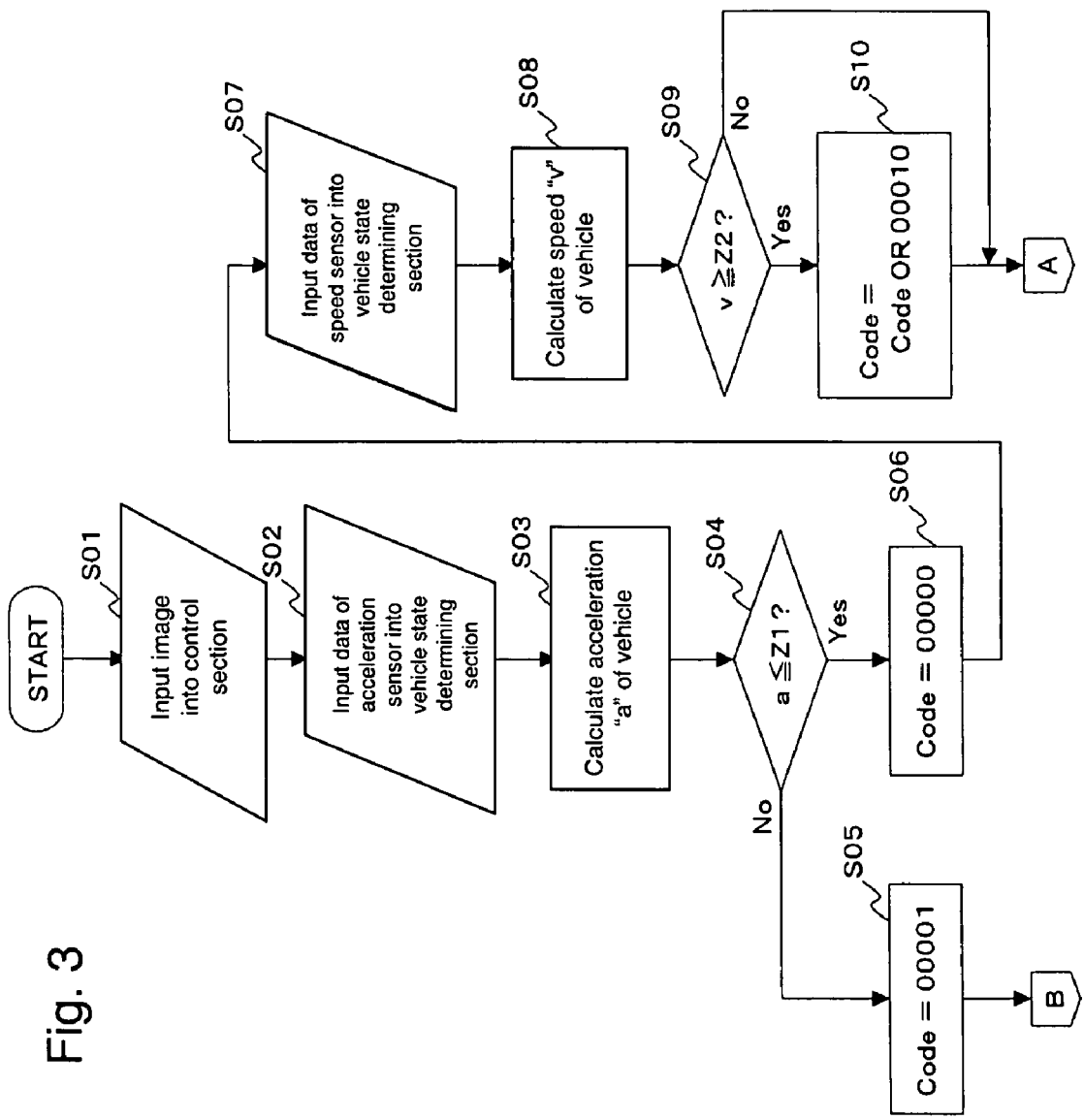
FIG. 3 shows a flow chart showing an operation example of an application selecting section.
Figure 4:
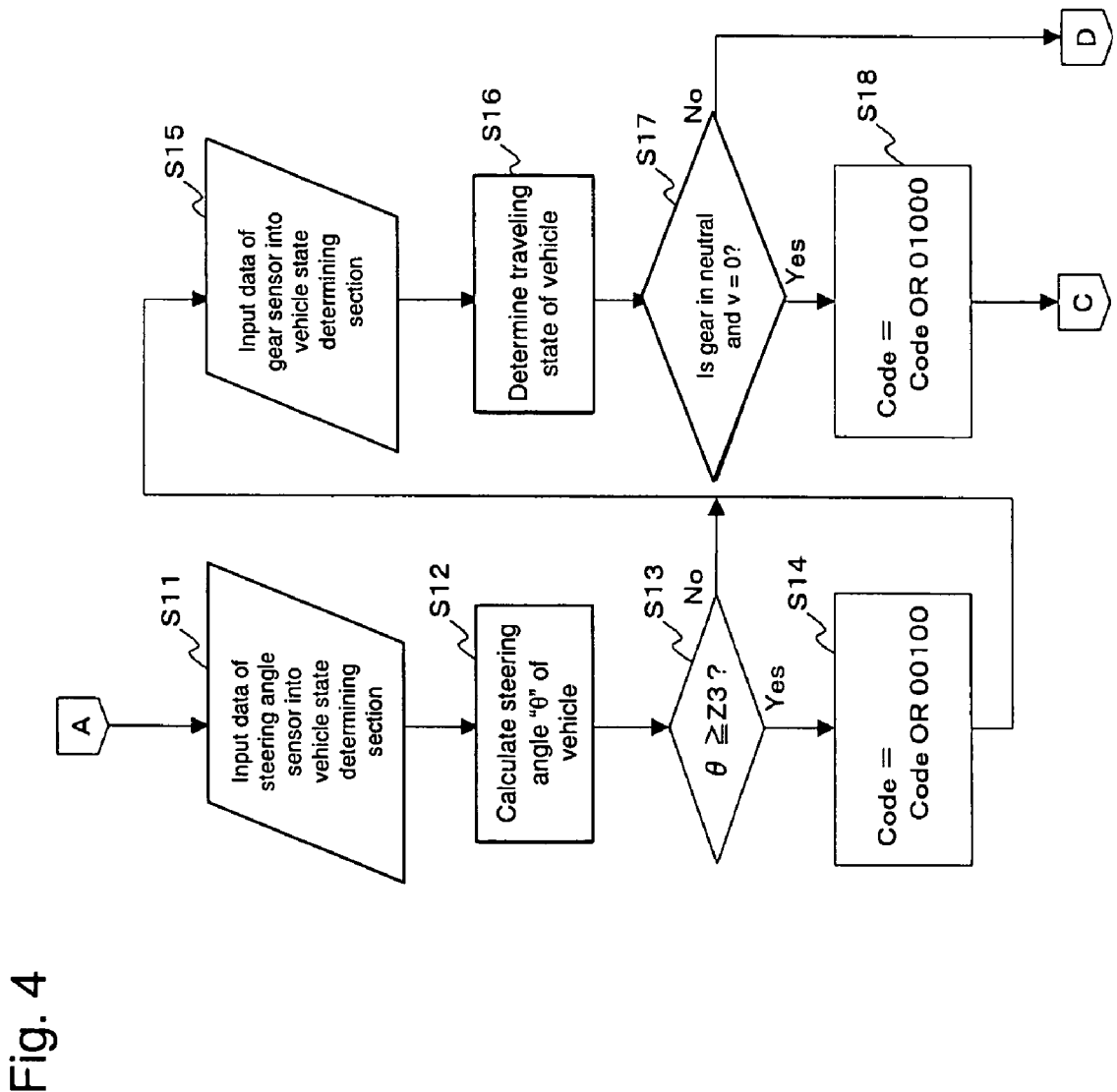
FIG. 4 shows a flow chart showing the operation example of the application selecting section.
Figure 5:
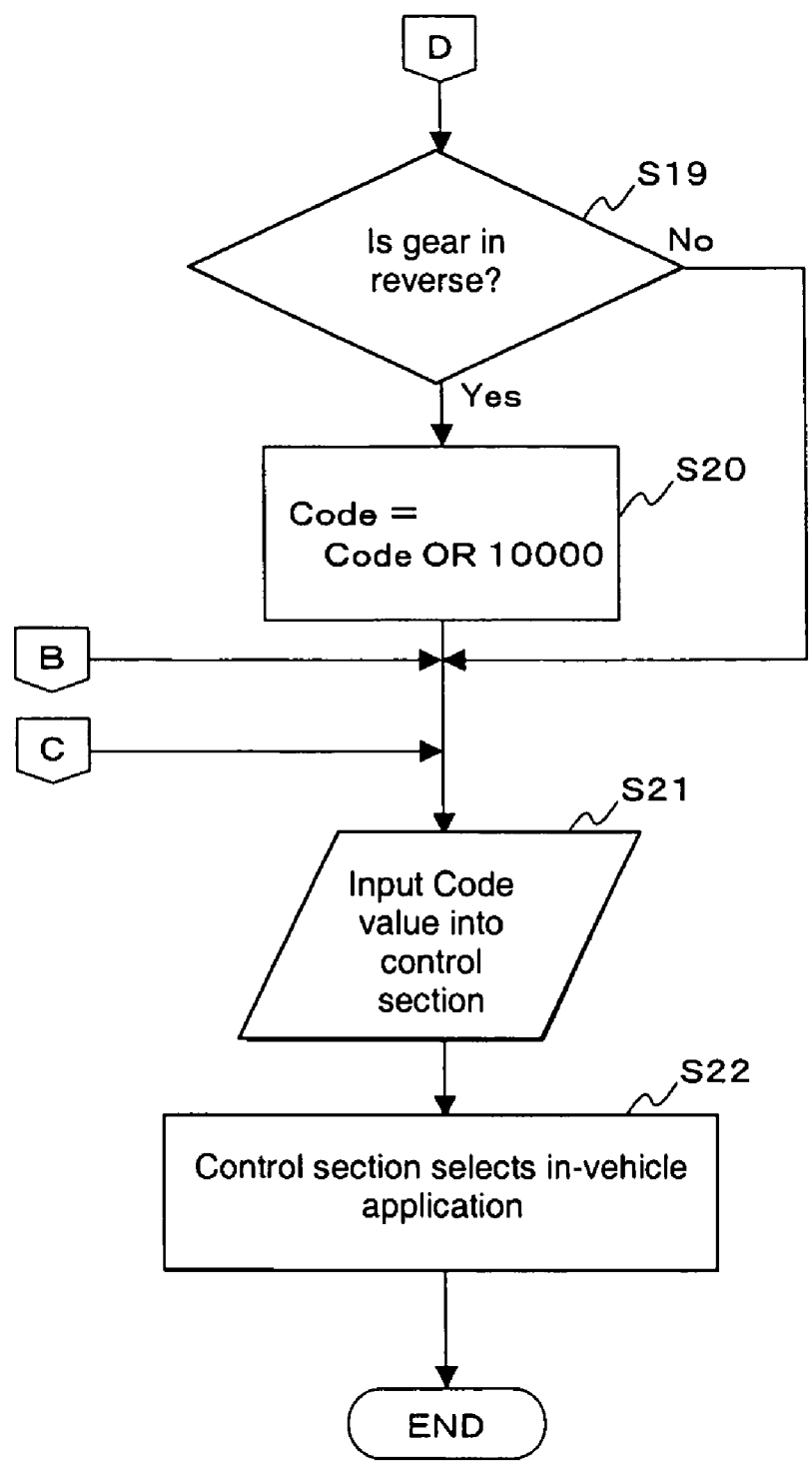
FIG. 5 shows a flow chart showing the operation example of the application selecting section.

FIGS. 3 to 5 are flowcharts showing an operation example of the application selecting section 5. Using FIGS. 3 to 5, the operation example of the application selecting section 5 is described.

First, an image picked up by the camera 2 is inputted into the control section 8 (FIG. 3: S01). Next, data (output) of the acceleration sensor 3a is inputted into the vehicle state determining section 6 (S02). The vehicle state determining section 6 calculates an acceleration "a" value of the vehicle based on the inputted data of the acceleration sensor 3a (S03). The vehicle state determining section 6 determines whether or not the calculated acceleration "a" value is not more than the threshold Z1. When the acceleration "a" is more than the threshold Z1 (S04-No), the vehicle state determining section 6 defines a variable Code, and substitutes "00001" into this variable Code (S05). On the other hand, when the acceleration "a" is not more than the threshold "Z1" (S04-Yes), the vehicle state determining section 6 defines the variable Code, and substitutes "00000" into this variable Code (S06).

After the process in S05, processes in and after S21 are executed. The processes in and after S21 will be described later. After the process in S06, data of the speed sensor 3b is inputted into the vehicle state determining section 6 (S07). The vehicle state determining section 6 calculates a speed "v" of the vehicle based on the inputted data of the speed sensor 3b (S08). The vehicle state determining section 6 determines whether or not the calculated speed "v" is not less than the threshold "Z2". When the speed "v" is not less than the threshold "Z2" (S09-Yes), the vehicle state determining section 6 substitutes a logical OR of the variable Code value and "00010" into the variable Code (S10).

After the process in S10, or when the speed "v" is less than the threshold "Z2" (S09-No), data of the steering angle sensor 3c is inputted into the vehicle state determining section 6 (FIG. 4: S11). The vehicle state determining section 6 calculates a steering (handle) angle "θ" of the vehicle based on the inputted data of the steering angle sensor 3c (S12). The vehicle state determining section 6 determines whether or not the calculated steering angle "θ" is not less than a threshold "Z3". When the steering angle "θ" is not less than the threshold "Z3" (S13-Yes), the vehicle state determining section 6 substitutes a logical OR of the variable Code value and "00100" into the variable Code (S14).

After the process in S14, or when the steering angle "θ" is less than the threshold "Z3" (S13-No), data of the gear sensor 3d is inputted into the vehicle state determining section 6 (S15). The vehicle state determining section 6 determines a traveling state of the vehicle based on the inputted data of the gear sensor 3d (S16). When the gear of the vehicle is determined to be in a neutral state and the speed "v" to be zero (S17-Yes), the vehicle state determining section 6 substitutes a logical OR of the variable Code value and "01000" into the variable Code (S18).

After the process in S18, the processes in and after S21 are executed. The processes in and after S21 will be described later. When the gear is determined not to be in a neutral state or the speed "v" not to be zero (S17-No), whether the gear is reversed or not is determined. When the gear is determined to be reversed (S19-Yes), the vehicle state determining section 6 substitutes a logical OR of the variable Code value and "10000" into the variable Code (S20).

After the process in S20, or when the gear is determined not to be reversed (S19-No), the processes in and after S21 are executed. In the following, the processes in and after S21 are described. First, the vehicle state determining section 6 inputs the variable Code value at this point into the control section 8 (S21). The control section 8 reads the in-vehicle application corresponded to the inputted variable Code value in the table 7a. The control section 8 then gives the inputted image to the read in-vehicle application(S22).

[Function/Effect]

In the application selecting system 1, the in-vehicle applications to be executed according to the state of the vehicle are defined in Table 7a. The application selecting section 5 estimates the state of the vehicle based on the output of the in-vehicle sensor 3, and then makes the in-vehicle application defined in the table 7a normally operate (offer a service), based on the estimated results. In other words, based on the state of the vehicle and the state of the driver which are estimated from the output results by the in-vehicle sensor 3, the application selecting section 5 selects the most suitable in-vehicle application to be executed in such states.

Therefore, the application selecting system 1 exerts effects as follows. First, when quality of an image picked up by the camera 2 is estimated not to be high enough from the states of the vehicle and the driver, such an image is not inputted into an in-vehicle application requiring an inputted image of high quality. This prevents improper operation which might occur due to low quality of an inputted image in the in-vehicle application, to improve the accuracy. Further, an in-vehicle application estimated not to be necessary for the driver, from the states of the vehicle and the driver, is not operated. This prevents unnecessary load from being applied to devices including the CPU, to execute other processes to be executed at high speeds. Namely, resources installed in the vehicle are effectively utilized.

[Transformed Example]

When the vehicle is an automatic transmission car (AT car), the gear sensor 3d may be configured to detect that a shift lever has been put into parking (p). In this case, the vehicle state determining section 6 makes a determination based on whether the shift lever has been put into parking or not, in the process in S17.

Further, the in-vehicle applications (functional section) to be applied to the in-vehicle application section 4 is not limited to those for providing a service to the driver, and may be those for providing a service to a person seated on the front seat or the back seat. In this case, the camera 2 is configured to further pick up a person seated on the front seat or the back seat.

Further, part of the function of the in-vehicle application section 4 may be configured to be disposed on a device outside the vehicle (e.g. application server). In this case, the in-vehicle application section 4 and the application server are configured to be capable of mutually sending and receiving data to and from each other by wireless communication. For example, they may be configured such that, in the doze detecting section 4b of the in-vehicle application section 4, the process of analyzing an inputted image (image picked up by the camera 2) to determine whether the driver is in a dozing state or not is executed by the application server, and according to the analyzed results, the doze detecting section 4b directly executes the process of awaking the driver.

Further, the personal identification section 4a may be configured to offer another service requiring the personal identification process. In this case, it is necessary to change the contents of the table 7a according to the contents of the service to be offered. Examples of another service include: a service of automatically controlling a seat position, a seatbelt position or a mirror angle according to previously registered information about individuals; and a service of identifying an occupant based on a face image of an actually driving occupant to enhance security when ETC (Electronic Toll Collection) or the like is used (e.g. Japanese Patent Laid-Open No. 2001-126091). In the case of the latter service, the need for executing the service even when the vehicle is traveling necessitates a change in the table 7a. Further, the in-vehicle application section 4 may be configured to have a plurality of functional sections to offer a service requiring the personal identification.

Further, the doze detecting section 4b may be configured to determine whether the vehicle driver is dozing or not, according to a standard (the number, frequency or tendency of blinking etc.) other than the width of opening eyelids.

Further, the looking-aside detecting section 4c may be configured to determine whether the vehicle driver is looking aside or not, according to a standard (a sight line direction of the driver, the frequency of the sight line off the front, the time when the sight line is off the front, etc.) other than the orientation of the driver's face. Further, the looking-aside detecting section 4c may be configured to warn the user by a method (a method of vibrating the seat, turning on a warning light, making the steering heavier, etc.) other than a warning sound.

Further, the sight-line detecting section 4d may be configured to offer another service requiring the sight-line detection processing. In this case, it is necessary to change the contents of the table 7a according to the contents of the service to be offered. Examples of another service include: a service of shooting a sight line direction and a blind corner direction according to movement of the sight line, by use of an external shooting device (e.g. Japanese Patent Laid-Open No. 10-206789); and a service in which, in a vehicle installing a picture phone, the sight line of the speaker (driver in this case) is detected and according to the detection results, an image of the part around the speaker's eyes is transformed (e.g. Japanese Patent Laid-Open No. 6-6786). In the case of the latter service, for example, the need for providing a service only when the vehicle is in a halted state, in view of danger of using the picture phone while driving, necessitates a change in the table 7a. Further, the in-vehicle application section 4 may be configured to have a plurality of functional sections to offer a service requiring the sight line detection processing.

Further, the face position detecting section 4e may be configured to offer another service requiring the face position detecting processing. In this case, it is necessary to change the contents of the table 7a according to the contents of the service to be offered. Examples of the other services include: a service of most suitably adjusting a mirror angle according to the driver's face position (e.g. Japanese Patent Laid-Open No. 2002-274265); and a service of controlling the direction of an air from an outlet of an air conditioner according to the face position (e.g. Japanese Patent No. 3067381). In the case of the former service, when the vehicle travels backward, controlling the mirror position according to backward movement of the vehicle can be considered, and it is therefore necessary to change the table 7a so as to activate the gear even when it is in the reversed state.

What is claimed is:

1. An in-vehicle application selecting system, comprising:
   a pick-up device for picking up an image of a vehicle occupant;
   a plurality of in-vehicle application executing devices, each using an image picked up by the pick-up device to offer a service to the vehicle occupant;
   a sensor for measuring a state of a whole or a part of the vehicle; and
   a selection device for selecting an in-vehicle application executing device to be operated among the plurality of in-vehicle application executing devices, according to an output from the sensor, to operate a selected in-vehicle application executing device.

2. The in-vehicle application selecting system according to claim 1, further comprising:
   a table storing device for storing a table comprising the sensor output and a corresponding in-vehicle application executing device properly operable using an image of image quality estimated based on the sensor output; and
   a control device for selecting from the table the in-vehicle application executing device corresponding to the sensor output, to operate the selected in-vehicle application executing device.

3. The in-vehicle application selecting system according to claim 1, further comprising:
   a table storing device for storing a table comprising the sensor output and a corresponding in-vehicle application executing device necessary for a driver's state estimated based on the sensor output; and
   a control device for selecting from the table an in-vehicle application executing device corresponding to the sensor output, to operate the selected in-vehicle application executing device.

4. The in-vehicle application selecting system according to claim 2, wherein the sensor includes a vibration sensor for measuring vibration of a vehicle, and the table comprises an output from the vibration sensor that indicates vibration equal to or above a prescribed level, and an in-vehicle application executing device properly operable using a blurred image of a face.

5. The in-vehicle application selecting system according to claim 4, wherein the in-vehicle application executing device properly operable using a blurred image of a face is operated by detecting a position of a person's face from an inputted image.

6. An in-vehicle application selecting apparatus, comprising:
   a device for receiving an image of a vehicle occupant picked up by a pick-up device;
   a device for determining a state of the vehicle when the received image of the occupant was picked up, from an output of a sensor for measuring a whole or part of the vehicle; and
   a device for selecting an in-vehicle application to be provided with the received image of the occupant, among a plurality of in-vehicle applications each using an image picked up by the pick-up device to offer a service to the occupant, based on the state.

7. A program for making an information processing apparatus execute:
   a step of receiving an image of a vehicle occupant picked up by a pick-up device;
   a step of determining a state of the vehicle when the received image of the occupant was picked up, from an output of a sensor for measuring a whole or part of the vehicle; and
   a step of selecting an in-vehicle application to be provided with the received image of the occupant, among a plurality of in-vehicle applications each using an image picked up by the pick-up device to offer a service to the occupant, based on the state.

8. A program for making an information processing apparatus, installed in a vehicle, comprising:
- a pick-up device for picking up an image of a vehicle occupant;
- a sensor for measuring a state of a whole or part of the vehicle; and
- a plurality of in-vehicle application executing devices, each using an image picked up by the pick-up device to offer a service to the vehicle occupant, operable to execute a step of selecting an in-vehicle application executing device to be operated from the plurality of in-vehicle application executing devices, according to an output of the sensor for measuring a state of the whole or part of the vehicle, and a a step of operating the selected in-vehicle application executing device.

9. A method for selecting an in-vehicle application, comprising:
- a step in which an information processing apparatus receives an image of a vehicle occupant, picked up by a pick-up device;
- a step in which the information processing apparatus determines a state of the vehicle when the received image of the occupant is picked up, from an output of a sensor for measuring the whole or part of the vehicle; and
- a step in which the information processing apparatus selects an in-vehicle application provided with the received image of the occupant, among the plurality of in-vehicle applications each using an image picked up by the pick-up step to offer a service to the occupant, based on the state.

10. A method for selecting an in-vehicle application, comprising:
- a step in which an information processing apparatus, installed in a vehicle, comprises a pick-up device for picking up an image of a vehicle occupant, a sensor for measuring a state of a whole or part of the vehicle, and a plurality of in-vehicle application executing devices, each using an image picked up by the pick-up device to offer a service to the vehicle occupant, the information processing apparatus selecting an in-vehicle application executing device to be operated from the plurality of in-vehicle application executing devices, according to an output of the sensor for measuring a state of the whole or part of the vehicle; and
- a step in which the information processing apparatus operates the selected in-vehicle application executing device.

* * * * *